(12) United States Patent
Kawaji et al.

(10) Patent No.: US 9,487,133 B2
(45) Date of Patent: Nov. 8, 2016

(54) TURN LAMP FOR DOOR MIRROR

(75) Inventors: Yasushi Kawaji, Ota (JP); Akifumi Suzuki, Fujisawa (JP)

(73) Assignee: MITSUBA CORPORATION, Kiryu-shi (JP)

( * ) Notice: Subject to any disclaimer, the term of this patent is extended or adjusted under 35 U.S.C. 154(b) by 143 days.

(21) Appl. No.: 14/007,789

(22) PCT Filed: Mar. 23, 2012

(86) PCT No.: PCT/JP2012/057450
§ 371 (c)(1),
(2), (4) Date: Sep. 26, 2013

(87) PCT Pub. No.: WO2012/133147
PCT Pub. Date: Oct. 4, 2012

(65) Prior Publication Data
US 2014/0016341 A1 Jan. 16, 2014

(30) Foreign Application Priority Data
Mar. 30, 2011 (JP) ................................. 2011-074597

(51) Int. Cl.
*B60Q 1/26* (2006.01)
*B60Q 3/02* (2006.01)
*B60R 1/06* (2006.01)
*B60R 1/12* (2006.01)
*B60Q 1/38* (2006.01)
*F21V 8/00* (2006.01)

(52) U.S. Cl.
CPC ............ *B60Q 3/0203* (2013.01); *B60Q 1/2665* (2013.01); *B60Q 1/38* (2013.01); *B60R 1/06* (2013.01); *B60R 1/1207* (2013.01); *G02B 6/009* (2013.01); *G02B 6/0068* (2013.01)

(58) Field of Classification Search
CPC .......................... B60R 1/1207; F21S 48/2281
USPC ................................ 362/511, 498, 494, 516
See application file for complete search history.

(56) References Cited

U.S. PATENT DOCUMENTS

| | | | |
|---|---|---|---|
| 6,637,917 B2* | 10/2003 | Schwanz et al. | 362/487 |
| 7,513,664 B2* | 4/2009 | Chou | 362/494 |
| 8,113,701 B2* | 2/2012 | Ishikawa | 362/545 |
| 2003/0169160 A1* | 9/2003 | Rodriguez Barros | B60Q 1/2665 340/426.1 |
| 2004/0257790 A1* | 12/2004 | Tanaka | B60Q 1/26 362/23.07 |

(Continued)

FOREIGN PATENT DOCUMENTS

DE 10 2004 015 544 A1 11/2004
JP A-2004-319445 11/2004

(Continued)

OTHER PUBLICATIONS

International Search Report issued in Application No. PCT/JP2012/057450; Dated Jun. 19, 2012 (With Translation).

*Primary Examiner* — Peggy Neils
*Assistant Examiner* — Tsion Tumebo
(74) *Attorney, Agent, or Firm* — Oliff PLC

(57) ABSTRACT

A turn lamp to be mounted on a door mirror of a vehicle, the turn lamp includes a housing; a light source; and a substrate having a feeder circuit for the light source, wherein: the substrate is placed in the housing such that a plane direction of the substrate faces a horizontal direction when the door mirror is mounted to a vehicle body, and the light source is placed on the substrate such that an irradiation direction of the light source is parallel to the plane direction of the substrate.

5 Claims, 5 Drawing Sheets

(56) References Cited

U.S. PATENT DOCUMENTS

| | | | |
|---|---|---|---|
| 2005/0146886 A1* | 7/2005 | Furuya et al. | 362/494 |
| 2005/0276057 A1* | 12/2005 | Takahashi et al. | 362/494 |
| 2006/0146555 A1* | 7/2006 | Inaba | 362/494 |
| 2007/0290829 A1* | 12/2007 | Geiger | B60Q 1/2665 340/475 |
| 2008/0089080 A1* | 4/2008 | Kawaji | B60Q 1/2665 362/494 |
| 2010/0053986 A1* | 3/2010 | Ishikawa | B60R 1/1207 362/509 |
| 2010/0238015 A1* | 9/2010 | Fukasawa et al. | 340/465 |
| 2011/0001428 A1* | 1/2011 | Rodriguez Barros et al. | 315/77 |
| 2011/0157907 A1* | 6/2011 | Hwang | B60Q 1/2665 362/494 |

FOREIGN PATENT DOCUMENTS

| | | |
|---|---|---|
| JP | B-4215541 | 1/2009 |
| JP | A-2010-052441 | 3/2010 |
| JP | U-3165598 | 1/2011 |

\* cited by examiner

TURN LAMP FOR DOOR MIRROR

This application is the U.S. National Phase of PCT/JP2012/057450, filed Mar. 23, 2012, which claims priority from Japanese Patent Application No. 2011-074597, filed Mar. 30, 2011, the entire disclosure of which is incorporated herein by reference hereto.

BACKGROUND

The present disclosure relates to a turn lamp for a door mirror, which is to be mounted on a vehicle.

There exists a turn lamp (direction indicator) mounted on a door mirror that lights together with turn lamps provided at the front and back of the vehicle. The lamps are used together to draw attention to people around the vehicle.

Conventionally, a turn lamp for a door mirror is constructed by integrating a base housing and an outer lens that covers an outer side of the base housing in order to form a housing of the turn lamp, mounting a light source directly to a substrate having a feeder circuit for the light source, and placing the light source and the substrate in the housing (see Japanese Published Examined Patent Application No. 4215541, for example). In such a turn lamp, the substrate is placed with the plane direction thereof facing the vertical direction in a state where the door mirror is mounted to a vehicle body, and the light source is mounted to the substrate with the irradiation direction thereof being perpendicular to the plane direction of the substrate.

A turn lamp constructed by connecting a light source to a substrate via a bus bar is also known (see Japanese Published Unexamined Patent Application No. 2010-52441, for example). In such a turn lamp, the substrate and a light source mounting surface of the bus bar are placed with both plane directions thereof facing the vertical direction, and the light source is mounted with the irradiation direction thereof perpendicular to the plane direction of the light source mounting surface of the bus bar.

SUMMARY

When the turn lamps described above are mounted on a door mirror, it is sometimes necessary to decrease the vertical width of a housing of the turn lamp and to have a thinner turn lamp, in association with improving the design or space to place other components (e.g., a foot lamp or the like) to be mounted on the door mirror. In such a case, there is a problem in that a vertical width of a substrate or of a light source mounting surface of a bus bar makes it impossible to thin a housing, when the plane direction of the substrate or of the light source mounting surface of the bus bar faces the vertical direction as in Japanese Published Examined Patent Application No. 4215541 and Japanese Published Unexamined Patent Application No. 2010-52441.

Furthermore, a turn lamp where the plane direction of a substrate or of a light source mounting surface of a bus bar faces the vertical direction and a light source is mounted with the irradiation direction thereof being perpendicular to the plane direction of the substrate or of the light source mounting surface of the bus bar as in Japanese Published Examined Patent Application No. 4215541 and Japanese Published Unexamined Patent Application No. 2010-52441 has problems. In particular, when a plurality of light sources have different irradiation directions in the right-left direction and the front-back direction, a plurality of substrates or light source mounting surfaces of directions corresponding to the irradiation directions of the light sources need to be provided, causing an increase in the number of components or complicating the structure.

An exemplary aspect of the disclosure includes a turn lamp to be mounted on a door mirror of a vehicle, the turn lamp includes a housing; a light source; and a substrate having a feeder circuit for the light source, wherein: the substrate is placed in the housing such that a plane direction of the substrate faces a horizontal direction when the door mirror is mounted to a vehicle body, and the light source is placed on the substrate such that an irradiation direction of the light source is parallel to the plane direction of the substrate.

An exemplary aspect of the disclosure includes the light source that includes a regulation light source and a decorative light source that are placed on the same substrate. An exemplary aspect of the disclosure includes the housing that includes: an outer lens; a base housing integrated with the outer lens that covers an outer side of the base housing; a light guide for radiating light emitted from the light source; and an inner housing placed between the base housing and the outer lens, wherein: the inner housing is provided with a light guide fit part to be fitted with the light guide, one end side of the light guide fit part is notched, and a light source placement part of the substrate is built in the notch part in a positioned manner.

According to an exemplary aspect, it is possible to decrease the vertical width of a space to place a light source and a substrate as much as possible and it is therefore possible to achieve thinning of a housing of the turn lamp, which contributes to improvement of design or securing a space to place other components to be placed in a door mirror. In addition, it is difficult to look at a substrate facing the horizontal direction from the outside of a housing, which also contributes to an improvement of the design.

According to an exemplary aspect, a regulation light source and a decorative light source are placed on the same substrate, which contributes to a reduction in the number of components and simplification of the structure. In such a case, since the substrate is disposed in the horizontal direction and the light source is placed with the irradiation direction thereof being parallel to the plane direction of the substrate, the regulation light source and the decorative light source can be placed on the same substrate even when the irradiation directions thereof are different from each other in the right-left direction and the front-back direction.

According to an exemplary aspect, it becomes possible to position a light source in a turn lamp easily, and it is therefore possible to enhance the workability of assembling the turn lamp and to set the irradiation direction of the light source to a predetermined direction precisely.

BRIEF DESCRIPTION OF THE DRAWINGS

Various exemplary aspects of the disclosure will be described with reference to the drawings, wherein.

DETAILED DESCRIPTION OF EMBODIMENTS

Figure 1A:
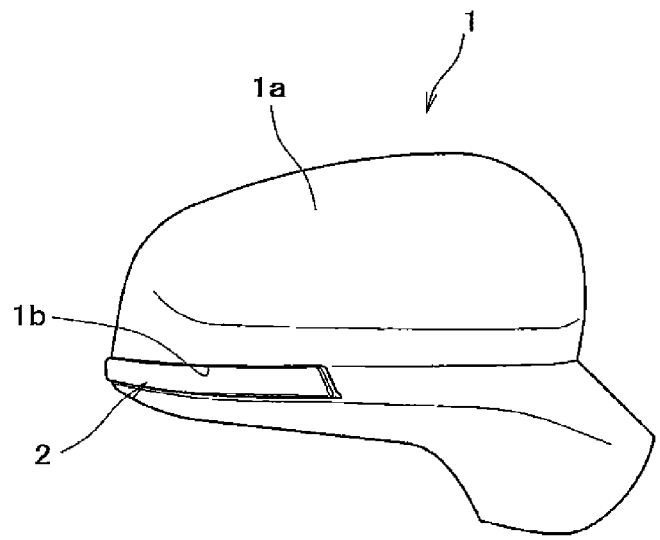
FIG. 1A is a perspective view of a door mirror and FIG. 1B is a perspective view of a turn lamp.
Figure 1A:
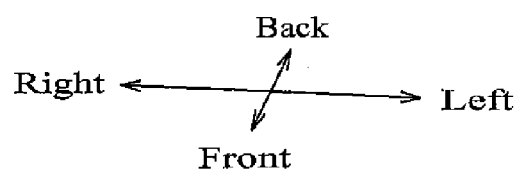
Figure 1B:
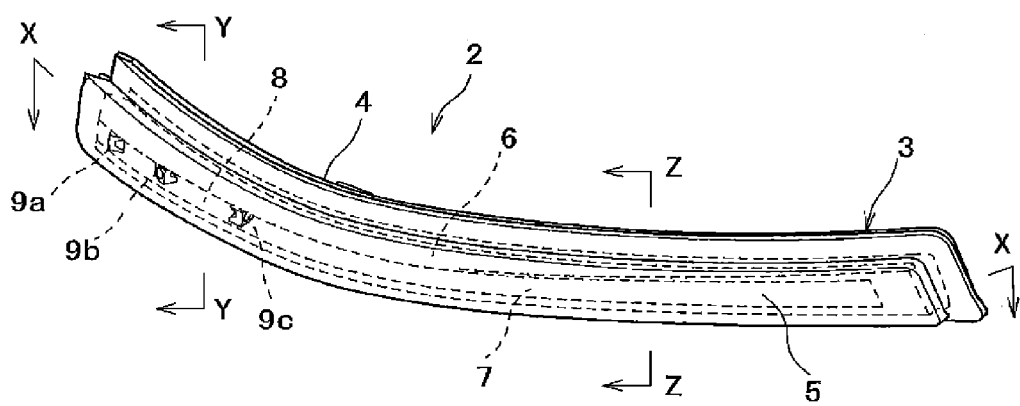
Figure 2:
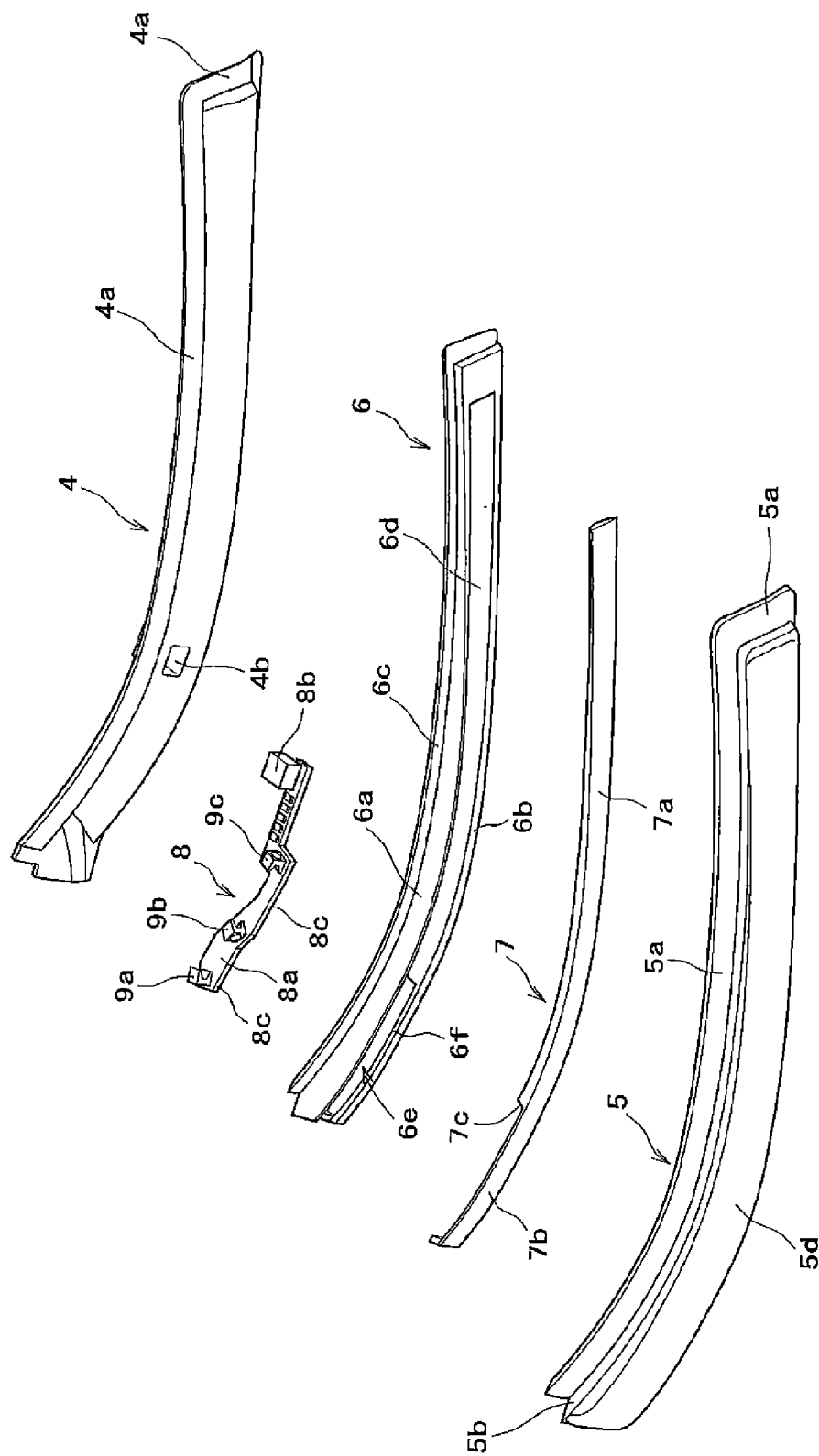
FIG. 2 is an exploded perspective view of a turn lamp.
Figure 3:
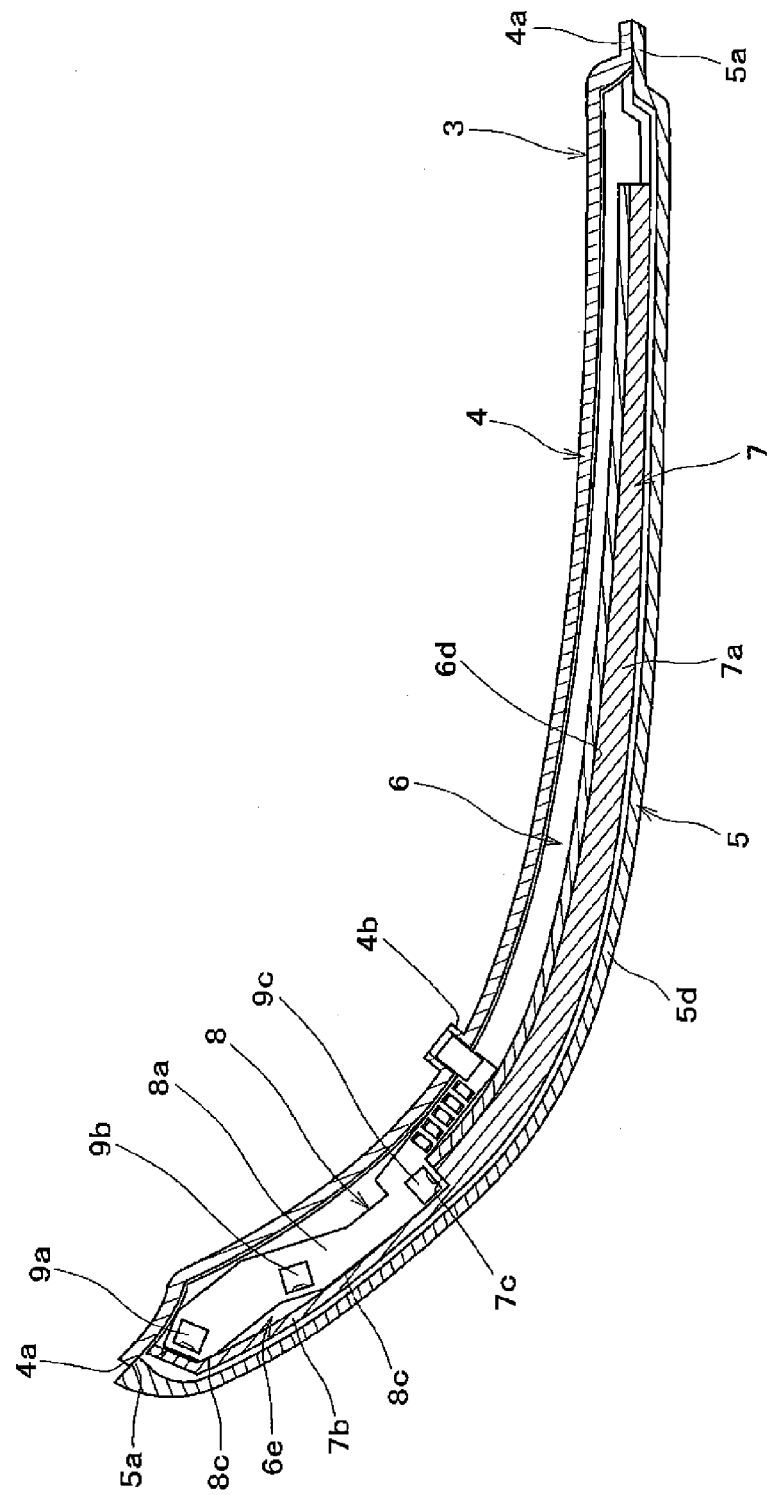
FIG. 3 is an enlarged sectional view along X-X in FIG. 1B.
Figure 4A:
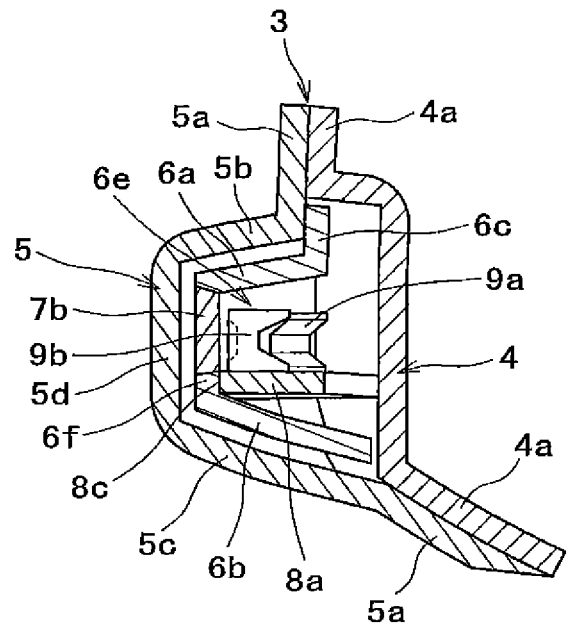
FIG. 4A is an enlarged sectional view along Y-Y in FIG. 1B
Figure 4B:
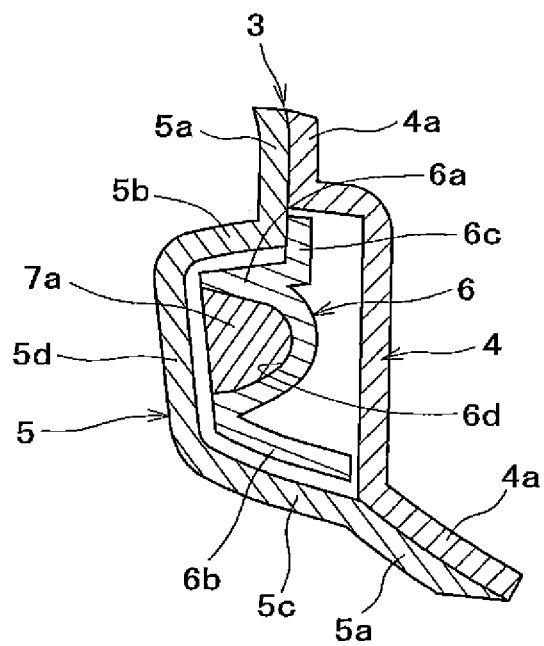
FIG. 4B is an enlarged sectional view along Z-Z in FIG. 1B.
Figure 5:
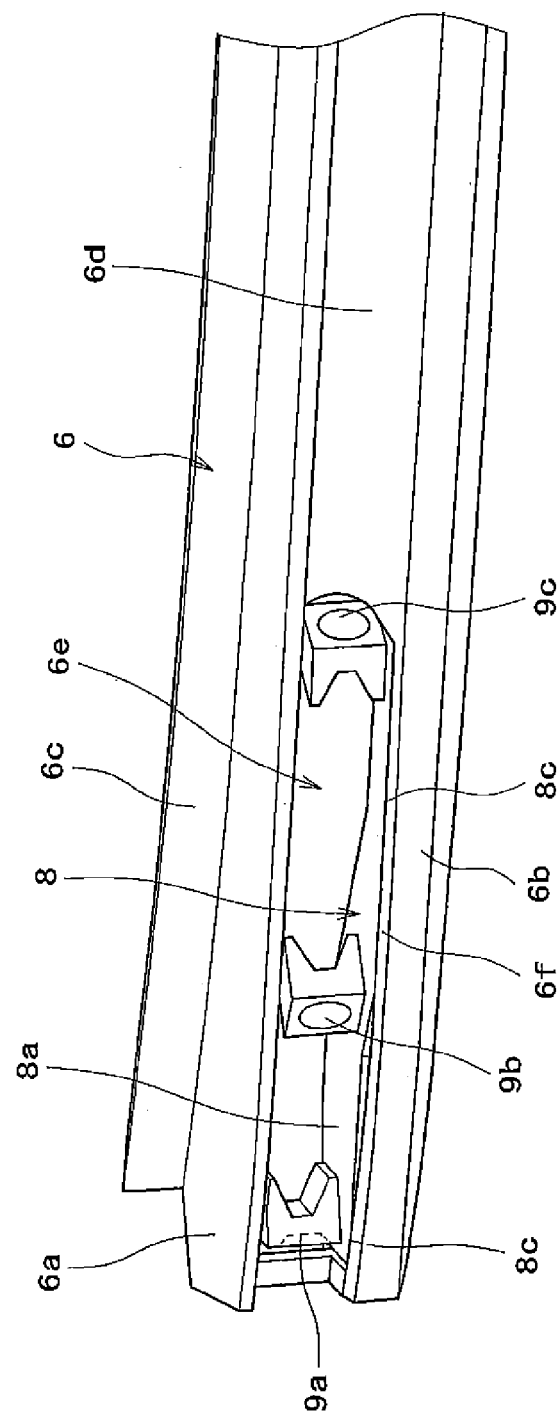
FIG. 5 is a view for illustrating a state where a light source placement part is built in a notch part.

The following description will explain an embodiment of the present disclosure with reference to the drawings.

Reference numeral 1 in the drawings is a door mirror to be placed on a door of a vehicle. A mirror body 1*a* which constitutes the door mirror 1 is provided with an opening (not illustrated) for a mirror formed at a back (back in the travelling direction of the vehicle) area, and a mirror which is not illustrated is fitted in the opening such that a position of the mirror can be adjusted freely. Moreover, a front (front in the travelling direction of the vehicle) area of the mirror body 1*a* bulges forward. An opening 1*b* for a lamp, which opens in an elongated shape in the lateral direction over the exterior in the right-left direction from a front area is formed below the bulging part, and a turn lamp 2 in which the present disclosure is implemented is built in the opening 1*b* for the lamp.

Here, although a symmetrical door mirror 1 is mounted to either a right door body or a left door body of a vehicle, the following description for the present embodiment will explain a door mirror 1 provided at the right side viewed from a driver on a vehicle as illustrated in FIG. 1A, and explanation for a door mirror 1 to be provided at the left side will be omitted. The back, front, right and left have been indicated in FIG. 1A for the door mirror 1 provided at the right side. Thus, the same directions apply when viewing the other figures (e.g., FIGS. 1B, 2, 3 and 5).

The turn lamp 2 is constructed to be built in the mirror body 1*a* as one unitary structure. A housing 3 of the turn lamp 2 is composed of a base housing 4 to be held in the inner side (back side) of the opening 1*b* for the lamp of the mirror body 1*a*, and an outer lens 5 which covers an outer side of the base housing 4 and is exposed to an outer surface of the door mirror 1. Additionally, the base housing 4 and the outer lens 5 are integrated in a state where butt contact parts 4*a* and 5*a* formed respectively at outer peripheral edge parts of the base housing 4 and the outer lens 5 butt contact with each other. In the structure of the present embodiment, the base housing 4 and the outer lens 5 are integrated by injecting resin material to the butt contact parts 4*a* and 5*a*.

The base housing 4 is integrally formed of an opaque member (a non-transmissive resin material), and is formed in an elongated shape in the right-left direction corresponding to the shape of the opening 1*b* for lamp of the mirror body 1*a* and in a curved shape with a right end area thereof, which corresponds to the exterior in the right-left direction of the door mirror 1, bent backward in an R-shape. Additionally, the base housing 4 is provided with the butt contact part 4*a* at an outer peripheral edge part as described above, and a cylindrical coupler part 4*b* in which an external connection terminal part 8*b* of a substrate 8, which will be described later, is held.

Moreover, the outer lens 5 is integrally formed of a transparent member (a transmissive resin material), and is formed in an elongated shape in the right-left direction similar to the base housing 4 described above and in a curved shape with a right end area thereof bent backward in an R-shape. Additionally, the outer lens 5 is formed in a concave groove shape with the base housing 4 side thereof opening in a longitudinal section with a topside side 5*b*, a downside side 5*c*, an outside side 5*d*, and the butt contact part 5*a* formed at an outer peripheral side of the concave groove.

On the other hand, reference numeral 6 in the drawings is an inner housing to be placed in the housing 3 composed of the base housing 4 and the outer lens 5. The inner housing 6 is integrally formed of an opaque member (a non-transmissive resin material), and is formed in an elongated shape in the right-left direction similar to the base housing 4 and the outer lens 5 and in a curved shape with a right end area thereof bent backward in an R-shape. Additionally, the inner housing 6 has an upper side 6*a* extended along the topside side 5*b* of the outer lens 5 over substantially the whole length in the right-left direction, a lower side 6*b* extended along the downside side 5*c* of the outer lens 5, and a butt contact side 6*c* extending upward from the upper side 6*a* to butt contact with the downside of butt contact part 5*a* of the outer lens 5 from the inner side of the housing 3. A light guide fit part 6*d* being a groove shape recessed in an arc-shape toward the base housing 4 is formed in an elongated shape in the right-left direction between the upper side 6*a* and the lower side 6*b*. A light guide 7, which will be described later, is constructed to be fitted in the light guide fit part 6*d* from the outer lens 5. Furthermore, at the right end side of the light guide fit part 6*d*, a notch part 6*e* for communicating the base housing 4 of the inner housing 6 with the outer lens 5 is formed between the upper side 6*a* and the lower side 6*b*, and a light source placement part 8*a* of the substrate 8 is constructed to be built in the notch part 6*e* in a positioned manner as will be described later.

The light guide 7 is a solid member which is integrally formed of a transparent member (a transmissive resin material) and has an elongated shape in the right-left direction, and is constructed to be fitted in the light guide fit part 6*d* of the inner housing 6 from the outer lens 5 as described above. In a state where the light guide 7 is fitted in the light guide fit part 6*d*, a right part of the light guide 7 is projected rightward more than the right end of the light guide fit part 6*d*. Additionally, regarding the light guide 7, a part fitted in the light guide fit part 6*d* is formed of a thick part 7*a* which has a flat shape at the outer lens 5 and an arc-like hemispherical shape at the base housing 4, while a part projecting rightward from the light guide fit part 6*d* is formed of a plate-like thin part 7*b*. The thin part 7*b* is fitted between the upper side 6*a* and the lower side 6*b* of the notch part 6*e*, so as to cover the outer lens 5 side of the notch part 6*e*. Furthermore, a right end part of the thin part 7*b* is bent backward, so as to cover the right side of the notch part 6*e*.

Furthermore, the substrate 8 is a flat plate-like printed substrate having a feeder circuit, such as wiring or an electronic component (a diode, a capacitor, a resistor or the like) necessary for causing a light source to emit light, built therein. A right side half part of the substrate 8 is the light source placement part 8*a* where first, second and third LEDs 9*a*, 9*b* and 9*c* functioning as light sources of the turn lamp 2 are mounted directly. Moreover, a left side half part of the substrate 8 is provided with the external connection terminal part 8*b* to be connected with an external power supply. A tip side of the external connection terminal 8*b* is housed in the coupler part 4*b* of the base housing 4. Additionally, the substrate 8 is incorporated in the inner housing 6 from the base housing 4 with the plane direction of the substrate 8 facing the horizontal direction in a state where the door mirror 1 is mounted to a vehicle body, with the light source placement part 8*a* of the right side half part built in the notch part 6*e* in a positioned manner, and with the left side half part positioned at a reverse face side (the base housing 4 side) of the light guide fit part 6*d*.

Here, a standing piece 6*f* standing from the lower side 6*b* to have a length corresponding to the thickness of the light guide fit part 6d is formed at the outer lens 5 side end part of the lower side 6b of an area of the notch part 6e of the inner housing 6, in a state where the inner surface of the groove of the outer lens 5 end part of the light guide fit part 6d is flush with and continuous with the upper surface of the standing piece 6f when viewed from the outer lens 5. Furthermore, the light source placement part 8a of the substrate 8 is constructed to be built in the notch part 6e so that the upper surface of the light source placement part 8a becomes flush with the upper surface of the standing piece 6f, making it almost impossible to view the substrate 8 from the outer lens 5. Furthermore, a contact part 8c to contact with the standing piece 6f when the light source placement part 8a is built in the notch part 6e is formed at a plurality of positions of the light source placement part 8a of the substrate 8, and the substrate 8 is constructed to be built in the notch part 6e in a positioned manner when the contact part 8c contacts with the standing piece 6f and the left end part of the light source placement part 8a contacts with the right end part of the light guide fit part 6d.

On the other hand, the first, second and third LEDs 9a, 9b and 9c are of a side view type wherein the irradiation directions thereof are parallel to the plane direction of the substrate 8 which is a mounting surface. The first, second and third LEDs 9a, 9b and 9c are constructed facing the outer lens 5 from the notch part 6e via the light guide 7 when the light source placement part 8a of the substrate 8 is built in the notch part 6e of the inner housing 6 as described above. In such a case, the first LED 9a and the second LED 9b are regulation light sources defined by regulations, and the first LED 9a is placed to cause irradiation diagonally backward right while the second LED 9b is placed to cause irradiation rightward, so that light is radiated diagonally backward right and rightward from the thin part 7b of the light guide 7. Moreover, the third LED 9c is a decorative light source and is placed to cause irradiation toward a step part 7c between the thick part 7a and the thin part 7b of the light guide 7, so that light elongated in the right-left direction is radiated forward from the thick part 7a of the light guide 7 when irradiation light from the third LED 9c enters.

In the present embodiment constructed as described above, the first, second and third LEDs 9a, 9b and 9c are light sources, and the substrate 8 having a feeder circuit for the first, second and third LEDs 9a, 9b and 9c built therein are placed in the housing 3 of the turn lamp 2 to be mounted on the door mirror 1. In such a case, the substrate 8 is placed with the plane direction thereof facing the horizontal direction in a state where the door mirror 1 is mounted to a vehicle body, and the first, second and third LEDs 9a, 9b and 9c are placed on the substrate 8 with the irradiation directions thereof being parallel to the plane direction of the substrate 8. As a result, it is possible to decrease the vertical width of a space to place the substrate 8 and the first, second and third LEDs 9a, 9b and 9c as much as possible, and it is therefore possible to achieve thinning of the housing 3 reliably when it is desired to thin the housing 3 of the turn lamp 2 in order to improve design or to secure a space to place other components such as a foot lamp at the door mirror 1. In addition, it is difficult to view the substrate 8 facing the horizontal direction from the outside of the housing 3, which also contributes to the improvement of the design. It is to be noted that the substrate 8 in the present embodiment is constructed to be built in the notch part 6e of the inner housing 6 in a state where the upper surface of the light source placement part 8a becomes flat with the upper surface of the standing piece 6f as described above, which makes it almost impossible to view the substrate 8 from outside of the turn lamp 3.

Furthermore, the turn lamp 2 is provided with the first LED 9a and the second LED 9b, which are regulation light sources defined by regulations, for irradiation backward right and laterally rightward (backward left and laterally leftward in a turn lamp 2 at the left side) and the third LED 9c, which is a decorative light source, for irradiation forward as light sources, and the first, second and third LEDs 9a, 9b and 9c are placed on the same substrate 8. That is, since the substrate 8 is disposed in the horizontal direction and the first, second and third LEDs 9a, 9b and 9c are placed with the irradiation directions thereof being parallel to the plane direction of the substrate 8, it becomes possible to make the irradiation directions of the first, second and third LEDs 9a, 9b and 9c different from each other in the right-left direction and the front-back direction even when the first, second and third LEDs 9a, 9b and 9c are placed on the same substrate 8. As a result, when a plurality of light sources having different irradiation directions are provided, it becomes unnecessary to provide a plurality of substrates or light source mounting surfaces having different directions corresponding to the irradiation directions of the light sources, and therefore it becomes possible to place the first, second and third LEDs 9a, 9b and 9c on the same substrate 8 even when the irradiation directions of the first LED 9a and the second LED 9b as regulation light sources and of the third LED 9c as a decorative light source are different from each other in the right-left direction and the front-back direction. This contributes to the reduction of the number of components and simplification of the structure.

Moreover, the housing 3 of the turn lamp 2 is formed by integrating the base housing 4 and the outer lens 5 covering an outer side of the base housing 4. The inner housing 6 is placed between the base housing 4 and the outer lens 5. The light guide fit part 6d to be fitted with the light guide 7 is formed at the inner housing 6, while the notch part 6e is formed at the right end side of the light guide fit part 6d, so that the light source placement part 8a of the substrate 8 is built in the notch part 6e in a positioned manner. As a result, it becomes possible to position the first, second and third LEDs 9a, 9b and 9c as light sources easily, and therefore it becomes possible to enhance the workability of assembling and to precisely set the irradiation directions of the first, second and third LEDs 9a, 9b and 9c to predetermined directions.

It is to be noted that it is clear that the present invention is not limited to the above embodiment, and, for example, it is also possible to place a light source on upper and lower plate surfaces of the substrate. Even in such a case, the light sources are placed with the irradiation directions being parallel to the plane direction of the substrate, and the irradiation directions of the upper and lower plate surfaces in the right-left direction and the front-back direction may be the same direction or different directions.

The present disclosure can be utilized for a turn lamp to be mounted on a door mirror of a vehicle.

The invention claimed is:

1. A turn lamp formed in an elongated shape in a right-left direction and to be mounted on a door mirror of a vehicle, the turn lamp comprising:
   a housing;
   a light source; and
   a substrate having a feeder circuit for the light source and
      a light source placement part on which the light source
      is placed, wherein:

the substrate is placed in the housing such that a plane direction of an upper surface of the light source placement part of the substrate is parallel to a horizontal plane direction when the door mirror is mounted to a vehicle body, the light source is placed on the upper surface of the light source placement part such that an irradiation direction of the light source is parallel to the plane direction of the upper surface of the light source placement part, the housing includes:
  an outer lens;
  a base housing integrated with the outer lens that covers an outer side of the base housing and is exposed to an outer surface of the door mirror; and
  an inner housing placed between the base housing and the outer lens, the inner housing is provided with a light guide fit part which is to be fitted with a light guide for radiating light emitted from the light source and is formed in an elongated shape in the right-left direction between an upper side and a lower side of the inner housing, a notch part is formed at an outside in the right-left direction of the light guide fit part so that a standing piece standing from the lower side of the inner housing is formed at an outer lens side end part, and the light source placement part of the substrate is built in the notch part in a positioned manner so that the upper surface of the light source placement part is flush with an upper surface of the standing piece at the notch part.

2. The turn lamp according to claim 1, wherein the light source includes a regulation light source and a decorative light source that are placed on the same substrate.

3. The turn lamp according to claim 1, wherein a front side end part of the light source placement part contacts with a back side end part of the standing piece of the inner housing so that the light source placement part is built in the notch part in a positioned manner.

4. The turn lamp according to claim 2, wherein irradiation directions of the regulation light source and the decorative light source are not the same.

5. The turn lamp according to claim 2, wherein the regulation light source includes two regulation light sources.

* * * * *